Aug. 29, 1961    G. W. KELLY    2,997,793
ELECTRICAL QUIZ AND GAME DEVICE
Filed Nov. 8, 1956    3 Sheets-Sheet 1

INVENTOR.
Gerard W. Kelly
BY
Munn, Liddy, Nathanson & March
ATTORNEYS

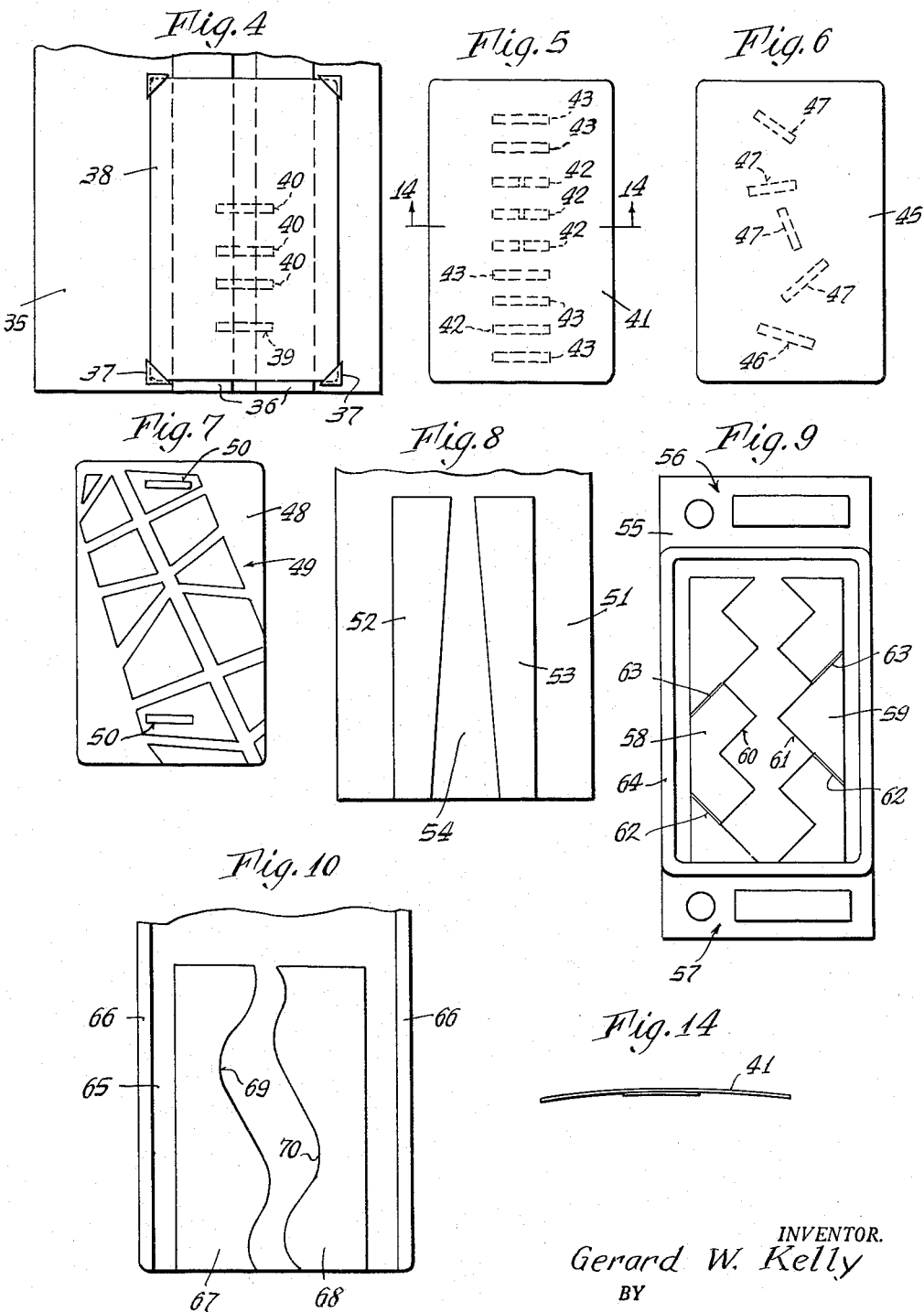

Aug. 29, 1961 G. W. KELLY 2,997,793
ELECTRICAL QUIZ AND GAME DEVICE
Filed Nov. 8, 1956 3 Sheets-Sheet 3
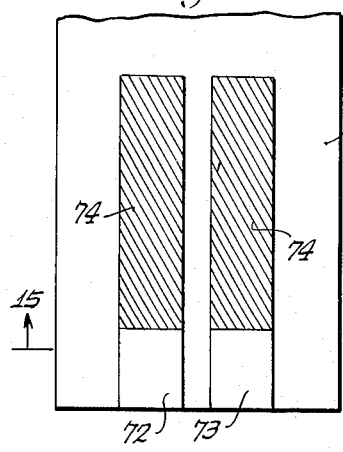
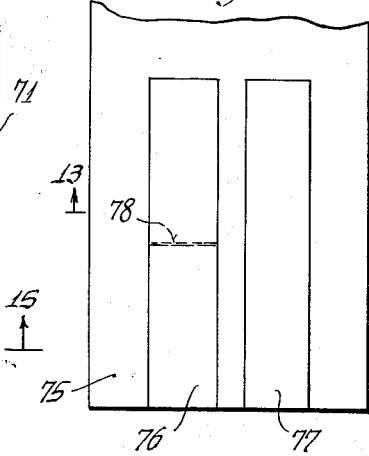
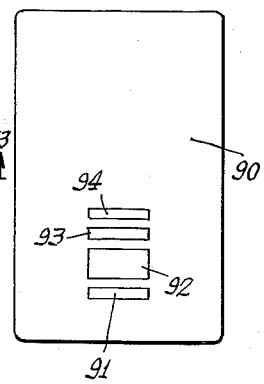
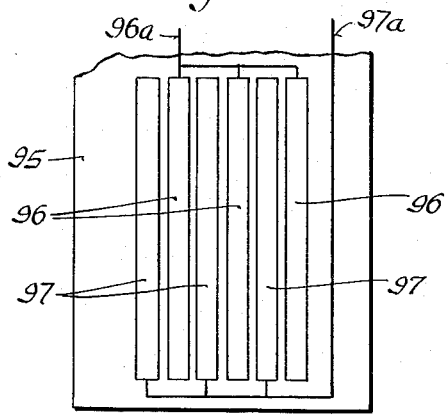
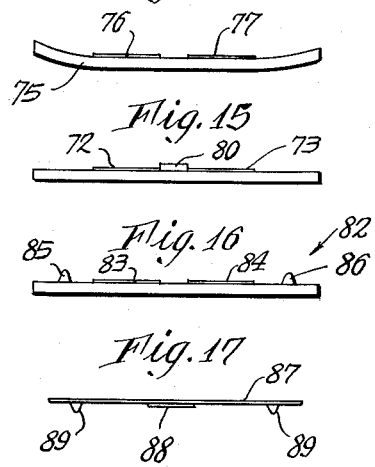
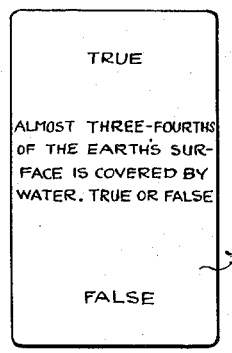
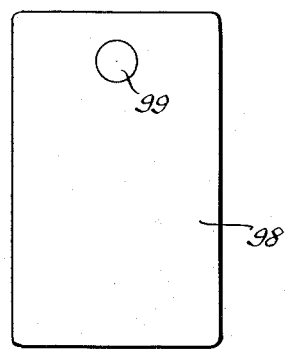
INVENTOR.
Gerard W. Kelly
BY
Munn, Liddy, Nathanson & March
ATTORNEYS

United States Patent Office 2,997,793
Patented Aug. 29, 1961

2,997,793
ELECTRICAL QUIZ AND GAME DEVICE
Gerard W. Kelly, 64 E. Park St., East Orange, N.J.
Filed Nov. 8, 1956, Ser. No. 621,144
3 Claims. (Cl. 35—9)

This invention relates to educational and recreational devices of the question and answer type, and more particularly to such devices wherein electrical means are employed to obtain the indication.

The invention embraces the use of cards, sheets, pages and the like, on which are imprinted or otherwise indicated questions, answers, quizzes and various intelligence matter such as clues, statements, directions, etc.

One object of the invention is to provide a novel and improved electrical quiz and game device that is extremely simple in construction, economical to manufacture, and very easy to use or operate.

Another object of the invention is to provide an improved quiz and game device as above set forth, wherein there is involved a high or appreciable play or amusement value.

A still further object of the invention is to provide an improved electric quiz and game device wherein by the touch of the fingers the answer or indication may be obtained in a mysterious and almost magical way which does not involve the usual visual switching or circuit closing devices.

A feature of the invention resides in the provision of a quiz and game device as above set forth, which has great versatility and a wide range of usefulness in spite of its simple and economical construction.

A further and important object of the invention is to provide an improved device of the above character, which is so inexpensive to produce that it may be employed by all of the individuals of a large group or class, without involving an appreciable, disproportionate expense.

Other features and advantages will hereinafter appear.

In the drawings accompanying this specification, similar characters of reference indicate corresponding parts wherever possible in the several views, in which:

FIGURE 4 is a plan view of a sensing device or answer illustrating a modification of the invention.

FIGURE 5 is a plan view of the rear side of an intelligence or question sheet illustrating another embodiment of the invention.

FIGURE 6 shows the rear of another form of question and answer sheet.

FIGURE 7 shows the rear of still another form of question and answer sheet.

FIGURE 8 is a plan view of a portion of another form of sensing device or answerer.

FIGURE 9 is a plan view of still another form of sensing device or answerer.

FIGURE 10 is a plan view of a portion of yet another form of sensing device.

FIGURE 11 is a plan view of a portion of still another form of sensing device.

FIGURE 12 is a plan view of a portion of yet another form of sensing device.

FIGURE 13 is a section on line 13—13 of FIGURE 12.

FIGURE 14 is a section on line 14—14 of FIGURE 5.

FIGURE 15 is an edge view of another form of sensing device.

FIGURE 16 is an edge view of yet another form of sensing device.

FIGURE 17 is an edge view of yet another form of question and answer sheet.

FIGURE 18 is a rear or bottom view of yet another form of question and answer sheet.

FIGURE 19 is a plan view of a portion of still another form of sensing device.

FIGURE 20 is a plan view of the front of still another form of question and answer sheet.

FIGURE 21 is a plan view showing the rear side of the card of FIG. 20.

Figure 1:
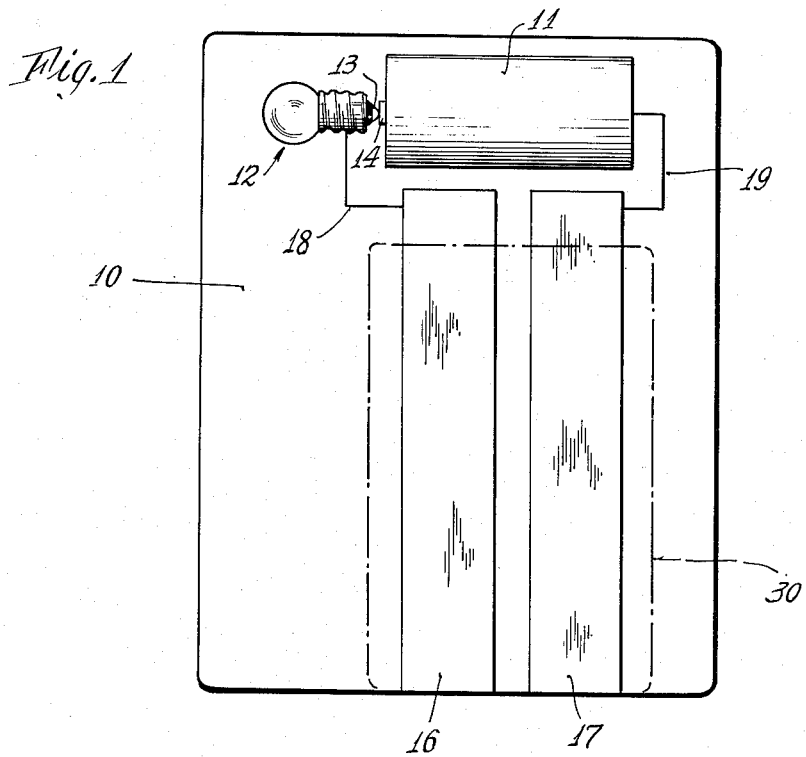
FIGURE 1 is a top or plan view of an improved sensing device made in accordance with the invention and constituting a portion of my electric quiz or game.
Figure 2:
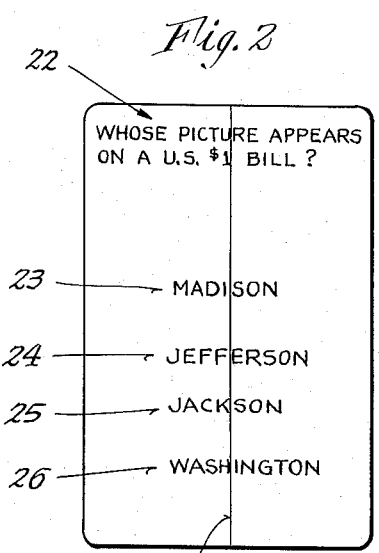
FIGURE 2 is a top or plan view of an answer board or sheet, made in accordance with this invention.
Figure 3:
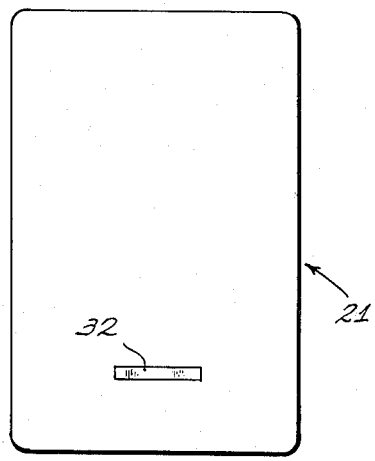
FIGURE 3 is a back or bottom view of the sheet shown in FIGURE 2.

As shown, my game device comprises, in the embodiment of the invention illustrated in FIGURES 1–3, a generally flat rectangular base 10 which may be advantageously formed of thin wood, plastic, cardboard, corrugated board, fiber or other insulating material. On the board 10 there is mounted, adjacent one end marginal portion a signal or indicator means in the form of a dry cell battery 11 and an incandescent bulb 12 in any suitable manner, the bulb 12 having its tip or central contact 13 engaged with the center or positive terminal 14 of the battery. The battery 11 and bulb 12 may, for example, be advantageously mounted by means of a cardboard housing, or a plastic housing having the necessary shape to accommodate these components and support them in the disclosed positions. It will be understood that other signal means may be utilized, as for example a buzzer, bell, spark, as from static, etc. Also, other sources of electricity, besides a battery, may be utilized.

Disposed on the base 10 are thin flat strips 16 and 17 having appreciable area whereby they may be termed "expansive" (having a large expanse), said strips being located in spaced relation to each other and being formed to have an exposed electrically conductive surface. The strips 16 and 17 form an open and exposed electric circuit which has sufficient area to enable it to be bridged simultaneously by a plurality of cooperable contacts. The strips 16 and 17 are connected respectively with the bulb 12 and battery 11 by wires 18 and 19, thereby to establish an open circuit which may be bridged and closed by placing a metallic member across the strips 16 and 17 so as to contact simultaneously the conducting surfaces thereof.

It will be understood that the strips 16 and 17 may be of sheet metal, or they may be constituted as a paint, ink or other metallic coating applied to the surface of the base 10 in any suitable manner and joined to the wires 18 and 19. Also, the strips may have various shapes, as will be later brought out.

Referring to FIGURES 2 and 3, there is shown an answer and indicator member 21 in the form of a flat generally rectangular sheet or thin board. The member 21 may be advantageously formed of plastic, thin wood, cardboard, stiff paper or other insulating material or material with an insulating surface.

On the sheet 21 there may be printed a question, indicated at 22, and also printed or otherwise indicated a number of possible answers 23, 24, 25 and 26 to the question 22. The answers 23–26 are preferably disposed in a row or column which is centrally located on the sheet 21. Also, I provide a straight center line 27 on the sheet 21, extending between the midpoint of the end margins of the sheet.

By the present invention the answer and indicator sheet 21 is intended to be superposed on the base 10 in a position indicated by the broken outline 30. To assist the user in so locating the sheet 21, the center line 27 is provided, since it will enable the user to easily centralize the sheet on the conductive strips 16 and 17.

Further, in accordance with the invention, I provide on the back or reverse side of the sheet 21 a member 32 having an exposed conductive coating or surface, such member being adapted to engage and bridge the strips 16 and 17 upon suitable downward pressure being applied to the sheet or card 21 at the proper place while the card is superposed on the base 10.

The member 32 may be constituted as a conductive metallic paint or ink, or other coating on the reverse side of the card 10. Or, it may be constituted of a thin strip of metal cemented or otherwise adhered or secured to the card. It may be metal foil, or metal coated paper adhesively secured to the card or heat welded thereto in any suitable manner. The member 32 is located in a predetermined position with regard to the correct one of the answers 23–26 on the card 21, such member being shown as directly under the answer "Washington" on the card.

With this organization, it will be readily apparent that, when the card 21 is placed on the base 10 so as to loosely rest thereon, there will not be positive contact between the strips 16 and 17, and the circuit through the bulb 12 will remain open. If the user presses on the card 21, when it is so positioned, at any of the answers except the correct answer "Washington," there will be no closing of the circuit through the bulb and the latter will remain unenergized, indicating that such answers are incorrect. However, upon the user pressing on the card at the answer "Washington," this will cause the member 32 to be held in positive electrically conducting contact with the strips 16, 17, thereby closing the circuit and causing the bulb to be illuminated.

The sensing contactors on the sensing device and the conducting members on the intelligence or answer and indicator sheet can be arranged in various ways to make it difficult or impossible for the user to discover the answer by ordinary visual means or casual examination. The following is a description of some ways that can be employed for this purpose.

The arrangement of the intelligence sheet and of the conductors associated with the answers may, for example, be made as follows: The intelligence sheet may have a number of similarly appearing members on its back, only those for the correct answer being conductive. Or, if the sheet 21 of intelligence matter is fastened to the sensing device in such a manner that the sheet cannot be examined on the back, then a conductor can be placed in the back of each correct answer without any further provision to hide or camouflage the relationship between the conductor and the correct answer. The sheet itself will conceal the position of the conductor and no further concealment is needed.

Conductors can also be placed on the back of a separate, supplementary sheet or card that is fastened to the sensing device while the intelligence sheet is placed over the said supplementary sheet. In this manner, the circuits remain concealed too, but the intelligence sheet can be removed and changed.

Accordingly, a modification of the invention is illustrated in FIGURE 4, wherein a base member 35 of a sensing device has contactors 36 and is further provided with corner pockets 37 to receive the corners of a supplementary card 38 having a conductive member 39 on its reverse side. If desired, the card 38 may also have a plurality of non-conductive members 40, all said members being of similar appearance. An answer sheet having a question and a number of answers may be placed over the sheet 38, and when the right answer is depressed or pressed on (i.e. that answer over the member 39) an indication will be given. With this organization the members 39 and 40 are concealed from the user of the device, and thus they need not be made to resemble each other perfectly, and in fact the members 40 may even be dispensed with.

When the intelligence sheet is not fastened to the answerer and can therefore be examined on the back for visual indications of the right answer, the following are some of the means that can be employed to conceal or disguise the relationship between the correct answers and the conductors on back of, or underneath, the intelligence sheet.

Conductors can be placed in proper positions at the correct answers while non-conductors, similar in appearance to the conductors, are placed at the wrong answers. With the conductors and non-conductors in back of the sheets, the need for identical appearance is lessened however, since the user must not only consider the appearance of the markings but also their position with respect to the answers.

Or, conductive markings or strips that are unbroken and conductive over their whole length can be placed in proper position with respect to the right answers while others that are split or broken, and are therefore not conductive over their whole length, are placed at the wrong answers. The unbroken conductors will close the circuit across the contactors, but the broken ones will not.

FIGURE 5 also shows the rear of a question-answer card 41 having conducting members 42 and also a plurality of non-conducting members 43, all of said members being made to have an identical appearance whereby the user cannot beforehand ascertain the correct answer. Instead, he must place the card 41 on the sensing device and press the various answers to ascertain which one is correct. Certain of the conductive members 42 may be formed of two separate insulated segments separated by insulation, the existence of said multi-part segments being concealed by a suitable finishing operation, whereby even though conductive they will not be effective to close the circuit.

Placing the conductors on back of the sheet is, in itself, a form of concealment that imposes a difficulty in visually detecting the correct answer. This means alone may be sufficient in certain cases, such as when a large sheet is used or when playing a game that requires trying the answer before turning over the card. However, if the conductors can be seen or otherwise detected through the sheet, then non-conductive markings, similar in size and shape to the conductors, can be placed at the wrong answers. These conductors and non-conductors will look alike as seen through the sheet but may be very different in appearance when viewed directly by turning the sheet over. For example, a strip of conductive silver paint and a heavy strip of non-conductive black paint will look alike when viewed through a translucent sheet but will be very different in color and texture when viewed directly.

In FIGURE 6 there is shown a question-answer card 45 having a conductive member 46 and a plurality of conductive or non-conductive members 47, said members being placed in haphazard positions whereby it cannot be readily determined which members will and which will not bridge the contactors of the sensing device. The members 46 and 47 need not necessarily be of identical shape or appearance.

Conductors can be arranged in irregular patterns and positions, and be placed at various angles, so that even if they are visually examined, it will be difficult or impossible to tell which conductors will close the circuit and which ones will not with respect to any answer.

Conductors can also be placed over a background on the sheet, or be intermingled in a pattern, so that it becomes difficult or impossible to see them or to estimate their positions with respect to answers. For example, a black conductor can be imprinted over a black background, or silver conductors can be included among a series of non-conductive silvery markings of the same size and shape. Other optical illusions can be used to hinder or avoid visual detection.

Conductors can be made of various lengths and shapes so that it is difficult or impossible to tell by visual examination which conductors will close the circuit and which ones will not when positioned on the answerer.

FIGURE 7 shows a question-answer card 48 having a design 49 on its rear surface, in which are concealed conductive members or portions 50 adapted to close the circuit through the sensing device. With this organization the user cannot determine beforehand which answer is correct.

In addition to the many possible conductor designs and arrangements on the intelligence sheet, visual detection of the correct answers can be further disguised or concealed by various designs of the sensing contactors. Designs of the contactors include the following and can be employed by themselves or in conjunction with one or more of the types of conductors just described.

Irregular patterns, shapes and positions of the sensing contactors increase the difficulty, or make it impossible, to see which conductors will touch a pair of contactors and close the circuit. For example, one or both of the contactors can be of varying width so that the gap between them also varies. When the sheet is placed on the answerer in proper registration, only the conductors for the correct answers will connect the contactors and thereby close the circuit but this relationship can defy detection by visual means. The contactors can also be made in a zigzag, checkerboard or other confusing patterns, in regular or irregular curves, etc.

For example, FIGURE 8 shows the base 51 of a sensing device having tapered contactors 52 and 53 arranged to provide a tapered space 54 between them, whereby it may not be readily determined whether certain members on the rear of the question-answer card will bridge the contacts to close the circuit.

The answerer or sensing device can have more than one pair or sets of contactors and it can have a plurality of signal devices so that two or more signals can be energized either simultaneously or separately.

FIGURE 9 shows the base 55 of a sensing device having a plurality of circuits and signal means 56 and 57, and having spaced contactors 58 and 59 provided with irregular edges 60 and 61 adjacent to each other to minimize the possibility of predetermining a correct answer. Also, the contactors 58 and 59 may have embossed grooves 62, simulating separations, and may have spaces 63 by which they are rendered discontinuous, thereby to further increase the difficulty of predetermining a correct answer.

In connection with the means just described for making the visual detection of answers difficult or impossible, it should be noted that the amount and kind of disguise or concealment needed to effectively defeat visual detection depend also on the powers of observation and deduction possessed by the user and how diligently he works to visually discover the answers. I therefore use the term, "difficult or impossible," to take in all degrees of difficulty that will be encountered by different users, under various circumstances of usage and for the different means that can be employed for visual inspection and detection. The means of concealment and disguise employed in the device can be made to suit any particular condition under which the device is to be operated. Further details of construction and operation are as follows:

The answerer or sensing device can have any of several means for automatically bringing the intelligence sheet into proper registration with the sensing contactors. For example, the answerer can be contained in a frame or box suited to the size of the sheet. When the sheet is placed in the box, it will fall into position on the answerer so that the conductors and the contactors are properly aligned. Registration can also be achieved by guides along the sides or at the corners of the answerer, and by any other convenient means. For manual registration, the sheet can be marked for lining up over the contactors, as previously described.

The sensing device of FIGURE 9 has a raised edge or border 64 by which the question-answer card may be readily positioned on the base.

FIGURE 10 shows a sensing device having a base 65 provided with side rails or guides 66 for positioning a question-answer card, and having elongate contactors 67 and 68 provided with curvilinear edges 69 and 70. The curved edges make it difficult for a user to predetermine which of a number of elements on the question-answer card would bridge the contactors 67, 68, and thus preclude the possibility of the correct answer being predetermined.

Certain areas of the contactors can be coated with a clear varnish or be otherwise covered with an insulating material to make the surface of the contactors non-conductive at those areas. This makes is difficult or impossible to tell visually which conductors will touch an insulated area and which will touch a conductive area of the contactors.

FIGURE 11 shows a modified sensing device having a base 71 and contactors 72 and 73 provided, on portions of their surfaces with invisible insulating coatings 74 by which certain conductive members of the question-answer card will be prevented from closing the circuit.

FIGURE 12 shows a sensing device having a base 75 provided with contactors 76 and 77, the contactor 76 being constituted of two separate conductive members separated by a space 78 which is concealed by a suitable surface finish. Thus, certain of conducting members on the question-answer card, even though bridging the contactors 76, 77, would not close the signal circuit.

With the above constructions, it will be understood that when a sheet is placed on the answer and a conductor on back of the sheet is properly registered with the sensing contactors, the signal will not become energized until there is sufficient pressure between the conductor and contactors to make an effective electrical connection. This pressure can be applied by finger or by any other means.

However, as an added precaution to keep the conductor from prematurely closing the circuit before the right answer is touched or pressed, one or more of the following means can be employed:

The base of the answer can be warped, curved or otherwise treated so that the contactors will not present a flat, plane surface but will become flat when pressed.

The sheet can be warped, curved or otherwise treated so that it will not lie sufficiently flat until pressed.

The gap between the contactors can be given a raised surface, such as by inserting a strip of paper or cardboard of appropriate thickness between the contactors. This raised surface will hold the sheet away from the contactors until pressure is applied.

The sheet can have pieces of paper, heavy spots of paint or other means on it, especially on or near the conductors, to keep the conductors from lying flat against the contactors until pressed.

The base or frame of the answerer can have raised areas to hold the sheet and conductors away from the contactors until pressure is applied.

FIGURE 13 illustrates that the base 75 may have a concave upper surface, thereby to normally hold the conducting member of the question-answer card spaced from the contactors 76, 77 except when the card is depressed by finger pressure.

FIGURE 14 illustrates a section of the question-answer card 41 of FIGURE 5, showing the card as being bowed by which the conductive members thereof will be held spaced from the contactors of the sensing device except when the card is depressed by finger pressure.

FIGURE 15 is a section on FIGURE 11, illustrating that a raised portion 80 may be provided between the contactors 72 and 73, to normally separate the conductive members of the question-answer card from the contactors, except when the card is bowed by pressure on two points located at opposite sides of the raised portions 80.

FIGURE 16 shows an edge view of a sensing device 82 having contactors 83 and 84, and having raised portions 85 and 86 which normally maintain a spacing between the contactors 83 and 84 and a question-answer sheet which may be placed on the sensing device 82. Pressure on the question-answer sheet, of course, will eliminate such spacing and enable the signal circuit to be completed.

FIGURE 17 shows a question-answer sheet 87 having a conductive member 88 and raised portions 89 on its underside, by which the conductive member 88 will be spaced from the contactors of the sensing device, except when the sheet 87 is bowed by finger pressure.

However, since the sheets do not normally lie sufficiently flat and do not, by themselves, exert enough pressure on the answer, it is generally not necessary to make any special provision for keeping the conductors from closing the circuits until pressed. But if a stiff sheet is used, such as a heavy piece of cardboard, one or more of these provisions may be incorporated to make sure that pressure at one place does not cause a conductor to close the circuit at another place, too.

The conductors on the intelligence sheet can also be of various widths so that as a finger is rubbed across the sheet over the conductors, the wider conductors will give longer signals and the narrower conductors will give shorter signals. The conductors can therefore be arranged to energize signals in code. For example, a long signal followed by a short signal would mean the letter "N" in Morse code. This can be used to transmit messages or to teach the code.

FIGURE 18 shows the rear of a question-answer sheet 90 having conducting members 91, 92, 93 and 94, the member 92 being wider than the members 91, 93 and 94. When such a sheet is used over a sensing device, and the finger of the user is made to travel upward or downward over the question-answer sheet while applying pressure thereto, short and long signals will be indicated, in the manner of Morse code.

The conductors may also be arranged in patterns to give more than one signal as a response to any answer. The absence of a conductor may further be regarded as a signal, as it could denote a negative answer.

The answerer can further have a large number of pairs of sensing contactors and the sheet can have a conductor wide enough to bridge the gaps between the contactors no matter what position the sheet is in with respect to the contactors. For example, a circular conductor of sufficient diameter to extend across any pair of contactors would close the circuit when the right answer over the conductor is pressed. This eliminates the necessity of registering the sheet on the answerer so as to line up the conductor and contactors in a particular position.

For example, FIGURE 19 shows the base 95 of a sensing device having three sets of staggered contactors 96 and 97, each set being electrically joined to a signal circuit by leads 96a and 97a. For use with this sensing device, a card 98 is provided, FIGS. 20 and 21, having a circular contactor surface 99 on its reverse side. The surface 99 is located in back of the "true" designation, representing the correct answer. When the card 98 is placed at random on the sensing device of FIGURE 19, a circuit will be closed through one pair of contactors 96—97, connected with the signal, thereby to provide an indication. No matter how the card is lined up with the contactors 96 and 97, pressure on the "true" area will close the circuit.

Variations and modifications may be made within the scope of the claims and portions of the improvements may be used without the others.

I claim:

1. An electric quiz and game comprising a sensing device equipped with an open electric circuit including a plurality of exposed, flat and expansive electric contacts formed and arranged to be bridged simultaneously by a plurality of electrically conductive members, an answer indicator comprising a lightweight, flexible sheet having a plurality of answers arranged in predetermined positions thereon, an electric conductive member fixed to said sheet with respect to one of said answers and exposed for engagement with said contacts in the electric circuit of the sensing device to close the circuit, and means to guard against the closing of the circuit by the mere positioning of the sheet on the sensing device with the conductive member located relative to the electric contacts, said flexible answer indicator being responsive to an application of pressure on the sheet at the location of said one answer to effect the engagement of the conductive member with the electric contacts to close the circuit.

2. An electric quiz and game according to claim 1, wherein said sheet is formed on one face thereof with the answers and the conductive member is fixed to the opposite face of the sheet.

3. An electric quiz and game according to claim 1, wherein the electric contacts comprise elongate and coextensive strips arranged in spaced-apart relation to one another and adapted for bridging engagement by said conductive member at any point throughout their length.

References Cited in the file of this patent

UNITED STATES PATENTS

| 2,148,259 | Cisin | Feb. 21, 1939 |
| 2,586,234 | Kopas | Feb. 19, 1952 |
| 2,663,091 | Brown | Dec. 22, 1953 |
| 2,697,882 | Gruot | Dec. 28, 1954 |
| 2,724,910 | Kelly | Nov. 29, 1955 |

FOREIGN PATENTS

| 1,051,948 | France | Sept. 23, 1953 |